US012749625B2

(12) United States Patent
Guk

(10) Patent No.: US 12,749,625 B2
(45) Date of Patent: Sep. 29, 2026

(54) FILM CAPACITOR HAVING BENT LEAD WIRES AND CAPACITOR MODULE

(71) Applicant: LG INNOTEK CO., LTD., Seoul (KR)

(72) Inventor: Hyun Sung Guk, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 169 days.

(21) Appl. No.: 18/718,850

(22) PCT Filed: Dec. 15, 2022

(86) PCT No.: PCT/KR2022/020505
§ 371 (c)(1),
(2) Date: Jun. 12, 2024

(87) PCT Pub. No.: WO2023/113511
PCT Pub. Date: Jun. 22, 2023

(65) Prior Publication Data

US 2025/0054699 A1 Feb. 13, 2025

(30) Foreign Application Priority Data

Dec. 16, 2021 (KR) ........................ 10-2021-0180584

(51) Int. Cl.
*H01G 4/236* (2006.01)
*H01G 2/06* (2006.01)
(Continued)

(52) U.S. Cl.
CPC ............. *H01G 4/236* (2013.01); *H01G 2/065* (2013.01); *H01G 4/224* (2013.01); *H01G 4/228* (2013.01); *H01G 4/32* (2013.01)

(58) Field of Classification Search
None
See application file for complete search history.

(56) References Cited

U.S. PATENT DOCUMENTS 3,806,766 A * 4/1974 Fanning .................. H01G 4/32 174/532
3,831,265 A * 8/1974 Louzon .................. H01G 4/224 257/729
(Continued)

FOREIGN PATENT DOCUMENTS

JP 60190031 U * 12/1985
JP 2000-049040 2/2000
(Continued)

OTHER PUBLICATIONS

English Translation JP 2016207920A (no date).*
International Search Report dated Mar. 21, 2023 issued in Application No. PCT/KR2022/020505.

*Primary Examiner* — Eric W Thomas
(74) *Attorney, Agent, or Firm* — KED & ASSOCIATES, LLP

(57) ABSTRACT

A capacitor module disclosed in an embodiment of the invention includes a capacitor including a case with an open lower surface, a capacitor body disposed within the case and having first and second electrodes on both sides, a resin portion sealing the capacitor body, a first lead wire having one end connected to a first electrode of the capacitor body and having an outer portion exposed to an outside of the resin portion, and a second lead wire having one end connected to a second electrode of the capacitor body and having an outer portion exposed the outside of the resin portion; a substrate disposed under the case and having a first hole coupled to the other end of the first lead wire of the capacitor and a second hole at the other end of the second lead wire; and a solder portion for fixing the other ends of the first and second lead wires in the first and second holes, wherein each of the first and second lead wires may include a curved bent portion between a lower end of the case and the resin portion.

19 Claims, 10 Drawing Sheets

(51) Int. Cl.

| | |
|---|---|
| ***H01G 4/224*** | (2006.01) |
| ***H01G 4/228*** | (2006.01) |
| ***H01G 4/32*** | (2006.01) |

(56) References Cited

U.S. PATENT DOCUMENTS

| | | | | |
|---|---|---|---|---|
| 4,656,556 A * | 4/1987 | Westermann | H01G 2/065 | 29/25.42 |
| 6,043,972 A * | 3/2000 | Westermann | H01G 2/065 | 361/308.1 |
| 6,185,086 B1 * | 2/2001 | Tanaka | H01G 4/236 | 361/308.1 |

FOREIGN PATENT DOCUMENTS

| | | |
|---|---|---|
| JP | 2003-309038 | 10/2003 |
| JP | 2013-197251 | 9/2013 |
| JP | 2016-207920 | 12/2016 |
| JP | 2017-054848 | 3/2017 |
| KR | 20-2000-0013875 | 7/2000 |
| KR | 10-2008-0077759 | 8/2008 |
| KR | 10-2016-0020330 | 2/2016 |

* cited by examiner

【FIG. 1】
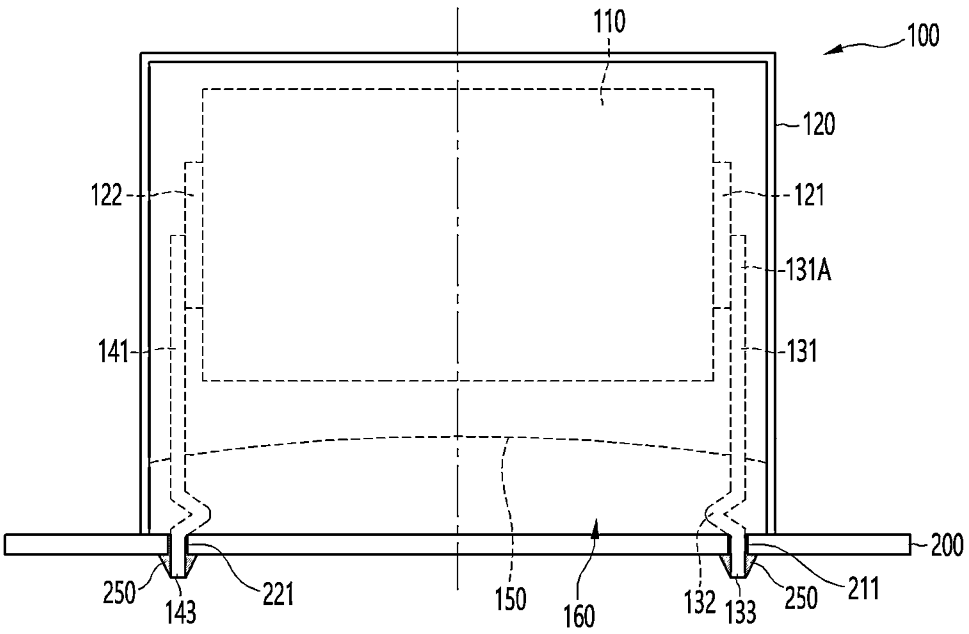

【FIG. 2】
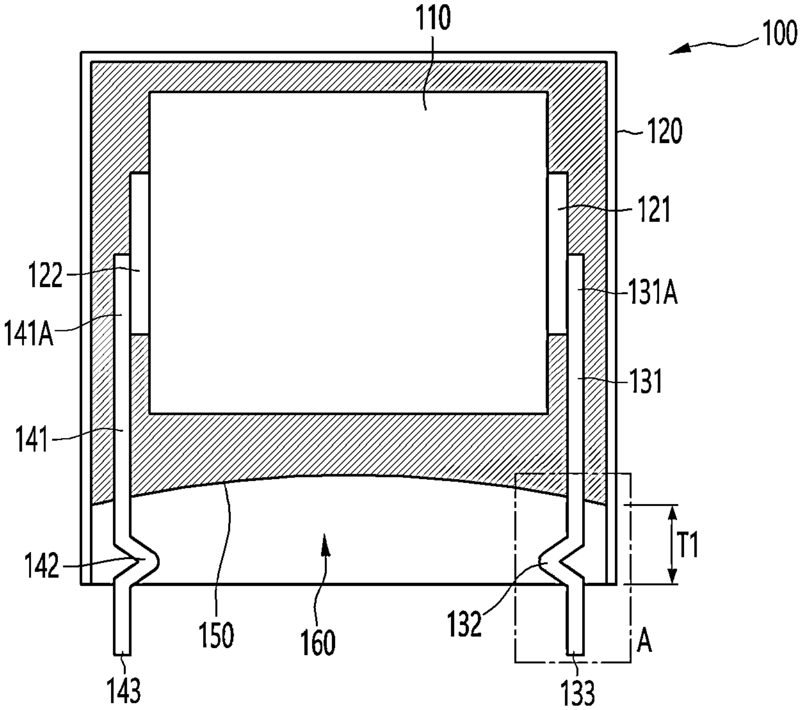
(A)
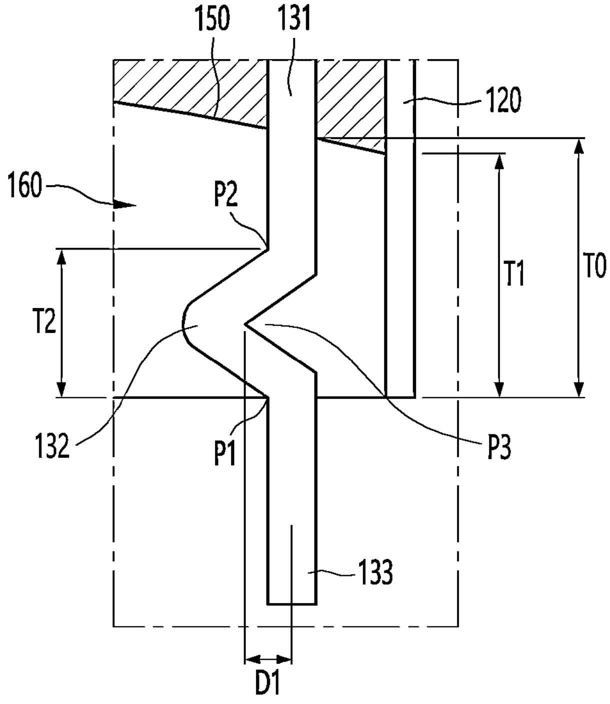
(B)

【FIG. 3】
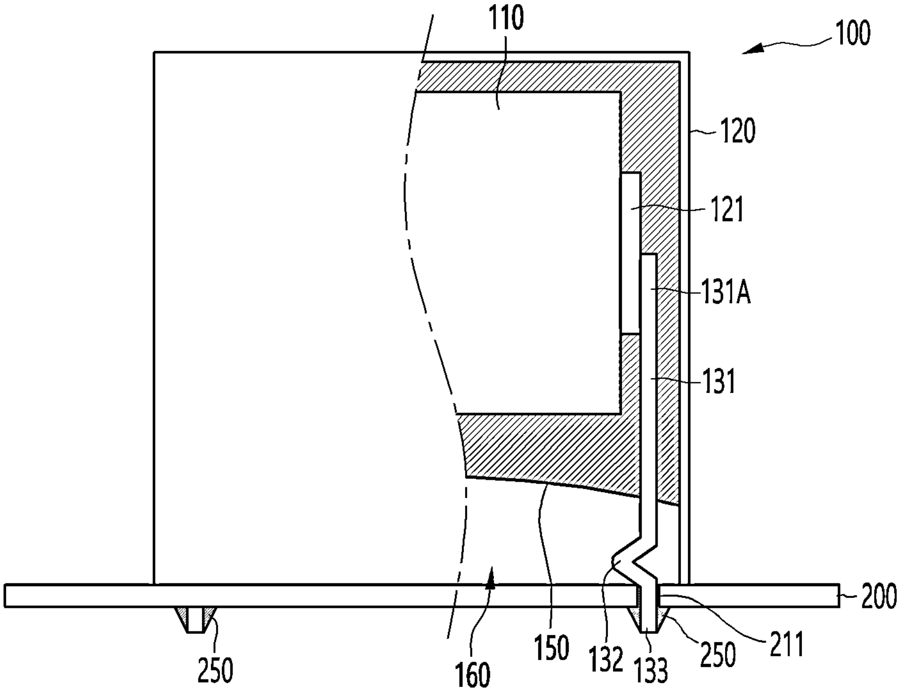
【FIG. 4】
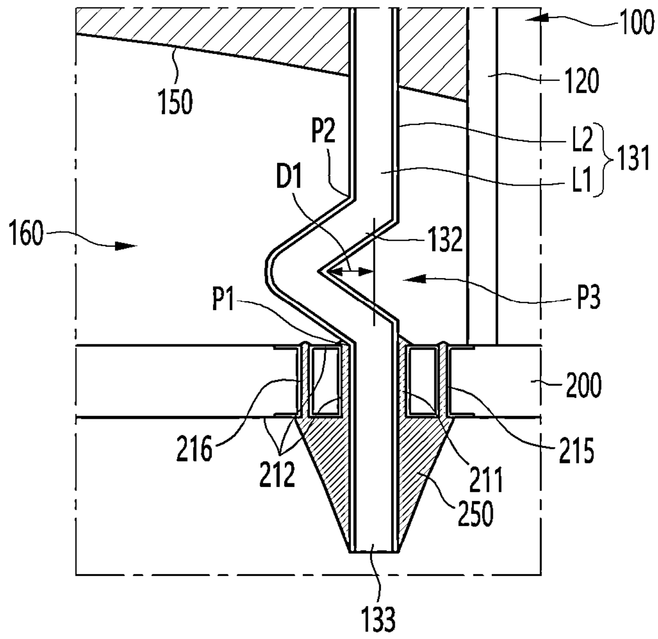

【FIG. 5】

【FIG. 6】
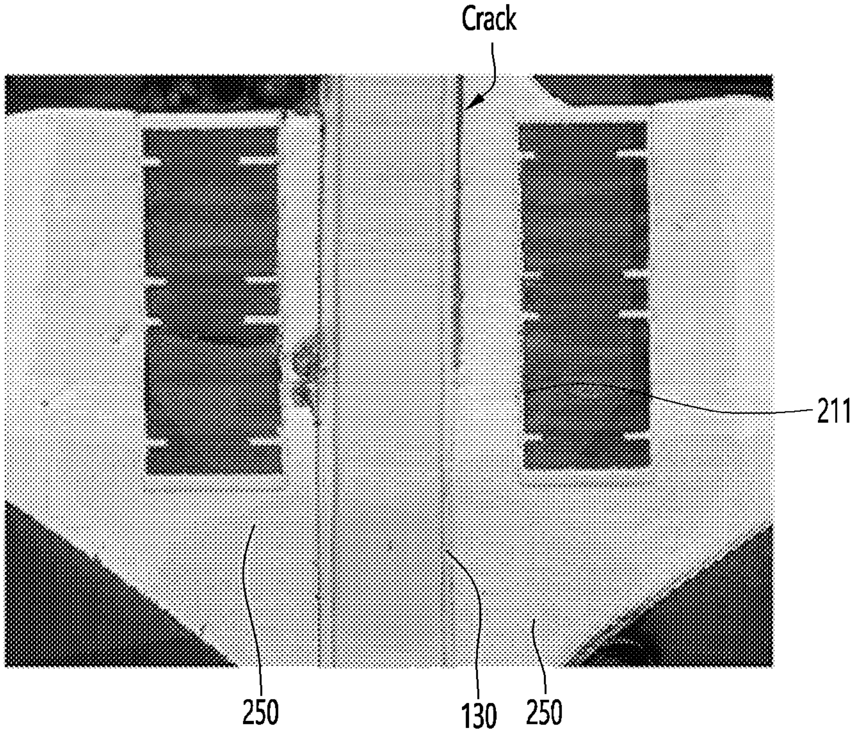
(A)
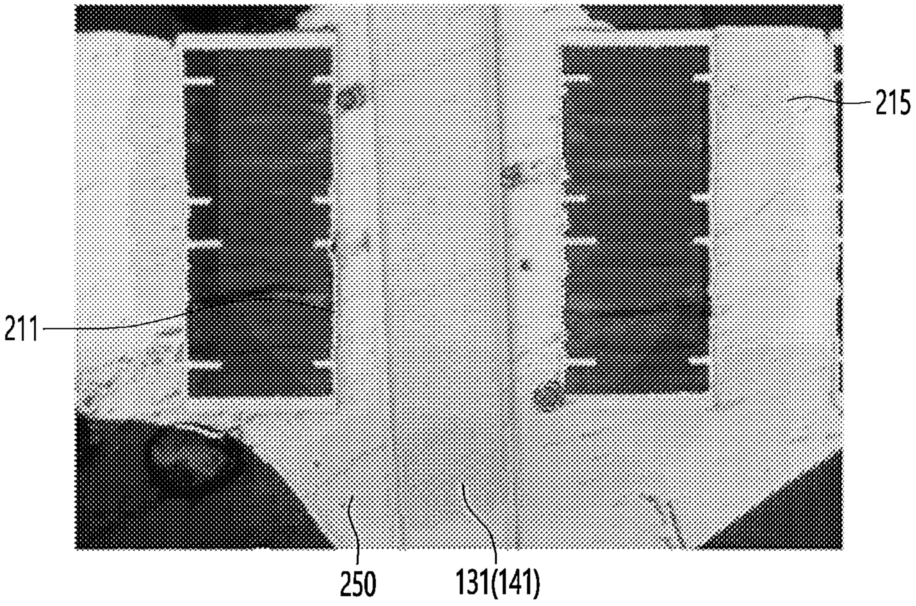
(B)

【FIG. 7】
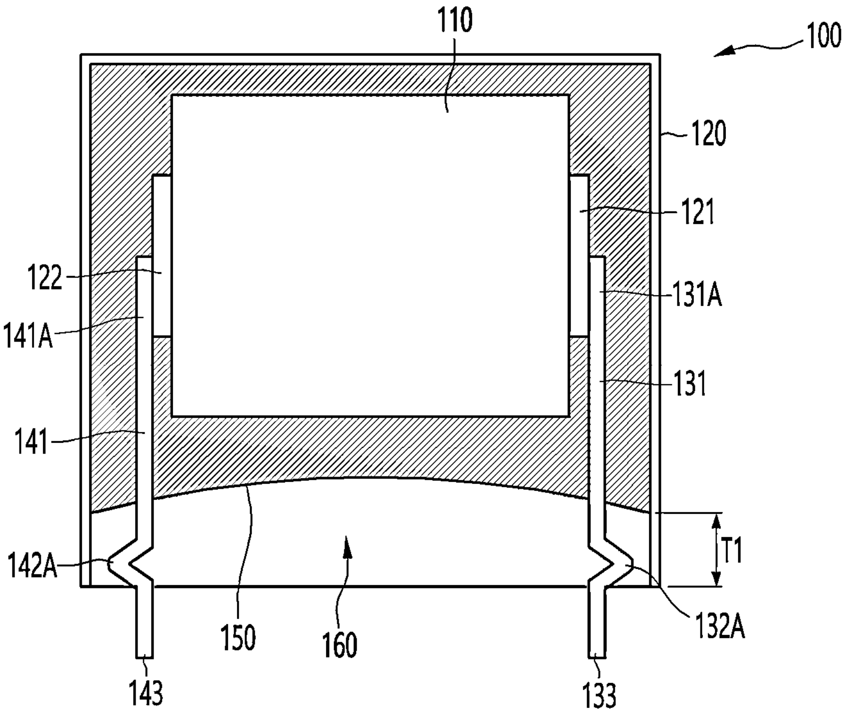

【FIG. 8】
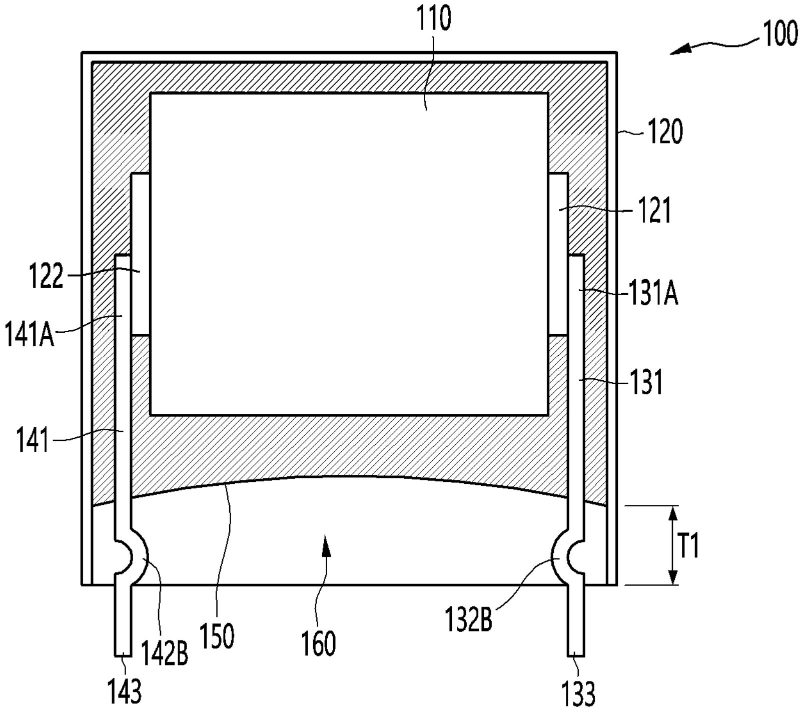

【FIG. 9】
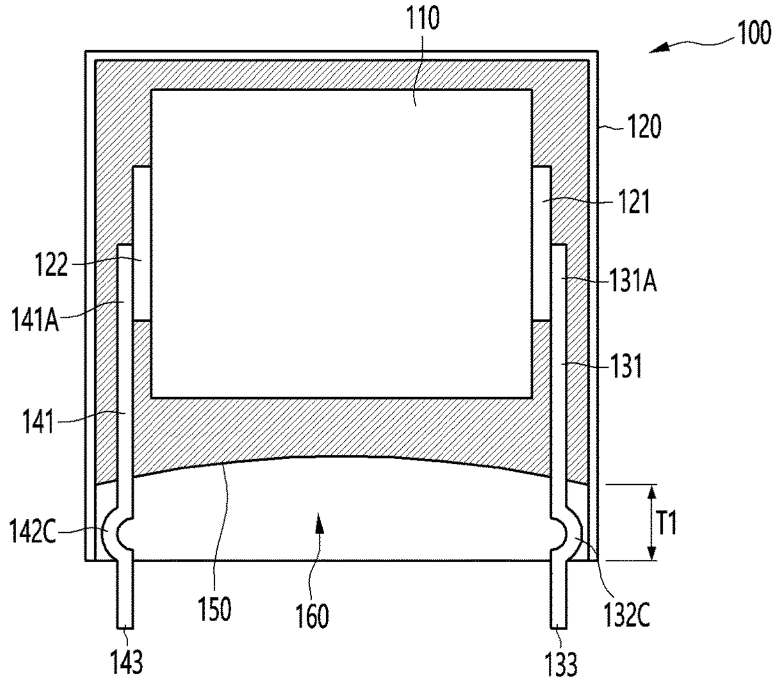
【FIG. 10】

【FIG. 11】
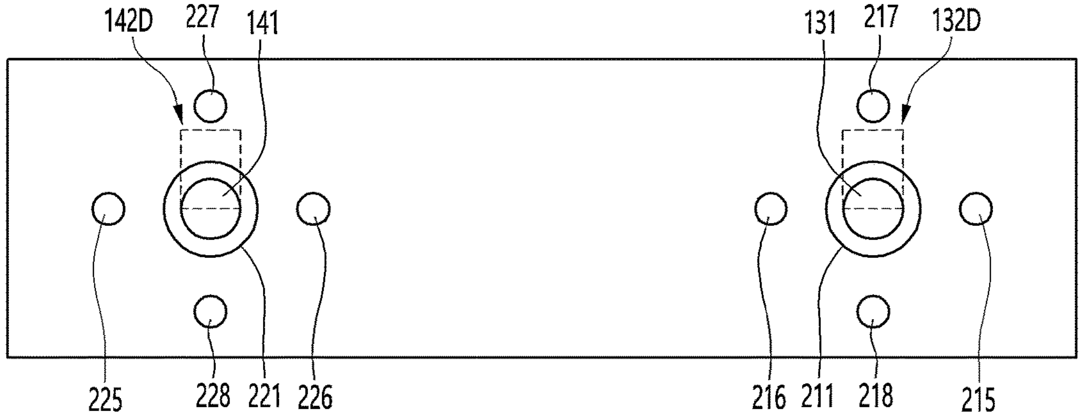
【FIG. 12】

【FIG. 13】
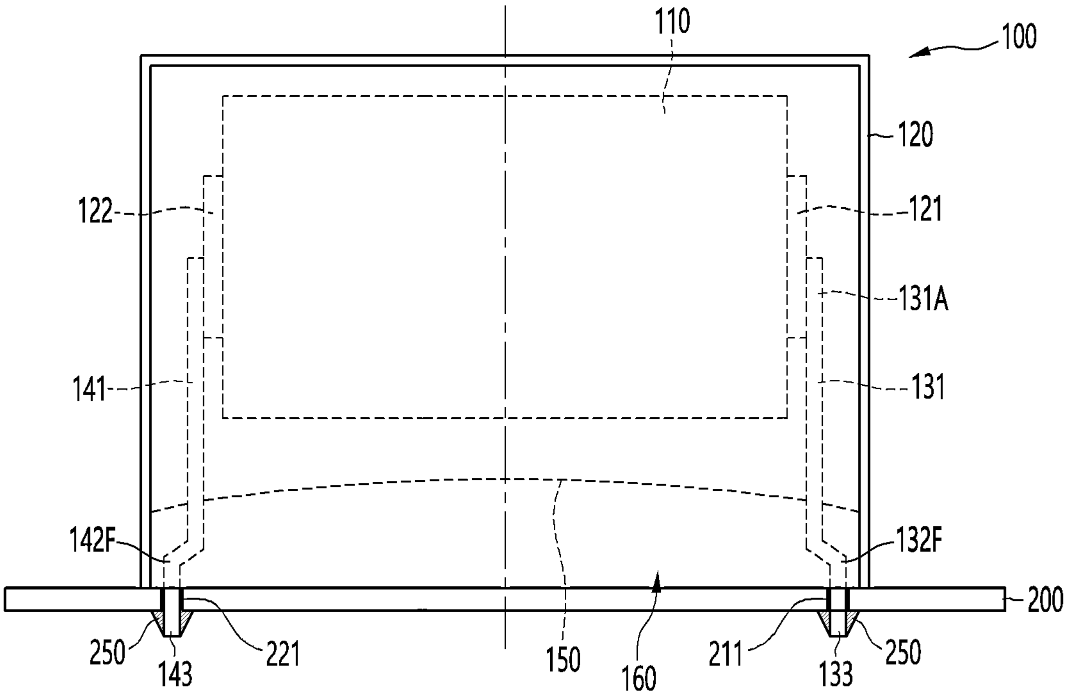

FILM CAPACITOR HAVING BENT LEAD WIRES AND CAPACITOR MODULE

CROSS-REFERENCE TO RELATED PATENT APPLICATIONS

This application is a U.S. National Stage Application under 35 U.S.C. § 371 of PCT Application No. PCT/KR2022/020505, filed Dec. 15, 2022, which claims priority to Korean Patent Application No. 10-2021-0180584, filed Dec. 16, 2021, whose entire disclosures are hereby incorporated by reference.

TECHNICAL FIELD

An embodiment of the invention relates to capacitors and capacitor module.

An embodiment of the invention relates to film capacitors and capacitor module equipped with the same.

BACKGROUND ART

Generally, when designing electronic circuits, capacitors are used to require a certain rated voltage and rated capacity. Types of capacitors include electrolytic capacitors, tantalum capacitors, or multilayer ceramic capacitors. Capacitors as described above are used by installing them on a circuit board (PCB). Recently, as products become lighter and simpler, the installation space for circuit boards is becoming smaller, which also places restrictions on the height at which capacitors may be installed on circuit boards. Meanwhile, capacitors are assembled by fixing the positive and negative terminals to a circuit board through soldering. Therefore, since the structure has no members other than the two terminals to secure the capacitor and the circuit board, it has the disadvantage of being vulnerable to external shock or vibration. Specifically, there is a possibility that the vibration of the circuit board is transmitted to the inside of the capacitor through the terminal, which is applied to the contact area inside the capacitor and causes contact failure. Shock and vibration applied to the outside of the capacitor may cause damage to the terminals and components provided in the contact portion. Damaged parts as described above cause an increase in leakage current during charging and discharging, thereby reducing charging and discharging efficiency, and deteriorating the capacitor due to heat generation and reducing the insulation voltage, which has a fatal impact on the life of the capacitor.

The contact failure within these products can cause fatal problems in capacitors where high voltage and large currents are charged and discharged, and for this reason, the transmission of internal vibration through the terminal must be completely blocked. Since the terminals of the capacitor are soldered to the circuit board, the vibration of a component body generated by the load of the component may be reversely transmitted to the soldered terminals. In this case, soldering defects in the terminal may result, and in the long run, the solder may be isolated, causing the circuit to open, or a fire may occur due to spark generation due to the contact failure. Recently, as the demand for modules with capacitors to be installed in vehicles with a lot of vibration increases, capacitor modules suitable for vehicles or devices with a lot of vibration are required.

DISCLOSURE

Technical Problem

An embodiment of the invention may provide a film capacitor having a bent portion in at least one lead wire and a capacitor module having the same. An embodiment of the invention can provide a film capacitor having a bent portion in each of a plurality of lead wires and a capacitor module having the same. An embodiment of the invention can provide a film capacitor having an elastic bent portion on the outside of a lead wire and a capacitor module having the same.

Technical Solution

A film capacitor according to an embodiment of the invention includes a case with an open lower surface; a capacitor body disposed within the case and having first and second electrodes on both sides; a resin portion sealing the capacitor body; a first lead wire having one end connected to a first electrode of the capacitor body and having an outer portion exposed to an outside of the resin portion; and a second lead wire having one end connected to a second electrode of the capacitor body and having an outer portion exposed the outside of the resin portion, wherein each of the first and second lead wires may include a curved bent portion between a lower end of the case and the resin portion.

According to an embodiment of the invention, the bent portions of the first and second lead wires may be bent toward an inside of the case. The bent portions of the first and second lead wires may be bent toward an outside of the case. The bent portions of the first and second lead wires may be bent in different directions of the case. The bent portions of the first and second lead wires may have a triangular or hemispherical side cross section.

According to an embodiment of the invention, the other ends of each of the first and second lead wires extend from the bent portion and may be disposed on the same straight line as one end of each of the first and second lead wires. The other ends of each of the first and second lead wires extend from the bent portion and may be disposed outside of one end of each of the first and second lead wires.

A capacitor module according to an embodiment of the invention includes a capacitor including a case with an open lower surface, a capacitor body disposed within the case and having first and second electrodes on both sides, a resin portion sealing the capacitor body, a first lead wire having one end connected to a first electrode of the capacitor body and having an outer portion exposed to an outside of the resin portion, and a second lead wire having one end connected to a second electrode of the capacitor body and having an outer portion exposed the outside of the resin portion; a substrate disposed under the case and having a first hole coupled to the other end of the first lead wire of the capacitor and a second hole at the other end of the second lead wire; and a solder portion for fixing the other ends of the first and second lead wires in the first and second holes, wherein each of the first and second lead wires may include a curved bent portion between a lower end of the case and the resin portion.

According to an embodiment of the invention, the bent portions of the first and second lead wires may be disposed between the substrate and the resin portion. The bent portions of the first and second lead wires may be bent toward an inside or outside of the case. The bent portions of the first and second lead wires may be bent in different directions of the case. The bent portions of the first and second lead wires may have a triangular or hemispherical side cross section.

According to an embodiment of the invention, the other ends of each of the first and second lead wires extend from the bent portion and are disposed on the same straight line as one end of each of the first and second lead wires, the substrate may include a plurality of first sub-holes around the first hole and a plurality of second sub-holes around the second hole, and the solder portions may be disposed in the first and second sub-holes, respectively. The capacitor body may be a film capacitor.

Advantageous Effects

An embodiment of the invention can prevent cracks in the solder portion where the end of the lead wire of the capacitor and the substrate are joined by providing a bent portion in the lead wire. An embodiment of the invention has the effect of absorbing deformation of the end of the lead wire due to a difference in thermal expansion coefficient between the capacitor and the substrate by providing a bent portion in the lead wire. An embodiment of the invention can improve the reliability of the film capacitor and the capacitor module equipped with the same against vibration in a moving object such as a vehicle by stably fixing the film capacitor to the substrate.

DESCRIPTION OF DRAWINGS

FIG. 1 is a perspective view of a capacitor module according to an embodiment of the invention.

FIG. 2 (A) is a side cross-sectional view of the film capacitor of FIG. 1, and (B) is an enlarged view of area A of FIG. 2 (A).

FIG. 3 is a partial side cross-sectional view of FIG. 1.

FIG. 4 is a partial enlarged view of FIG. 3.

FIG. 5 is a diagram showing an example of the lead wires of the film capacitor of FIG. 3 arranged on a substrate.

FIGS. 6 (A) and (B) are diagrams comparing the state of bonding lead wires to a substrate in a comparative example and an embodiment of the invention.

FIG. 7 is another example of FIG. 2(A).

FIGS. 8 and 9 are other examples of FIG. 2(A).

FIG. 10 is a diagram showing another example in which the lead wires of the film capacitor of FIG. 3 are arranged on a substrate.

FIGS. 11 and 12 are diagrams showing another example in which the lead wires of the film capacitor of FIG. 3 are arranged on a substrate.

FIG. 13 is a diagram showing another example of a lead wire of the film capacitor of FIG. 1.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. The terms used in the embodiments of the invention are for explaining the embodiments and are not intended to limit the invention.

In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

FIG. 1 is a perspective view of a capacitor module according to an embodiment of the invention, FIG. 2(A) is a side cross-sectional view of the film capacitor of FIG. 1, and (B) is an enlarged view of area A of FIG. 2(A), FIG. 3 is a partial side cross-sectional view of FIG. 1, FIG. 4 is a partial enlarged view of FIG. 3, FIG. 5 is a diagram showing an example of the lead wires of the film capacitor of FIG. 3 arranged on a substrate, FIGS. 6(A)(B) are diagrams comparing the state of bonding lead wires to a substrate in a comparative example and an embodiment of the invention, FIG. 7 is another example of FIG. 2(A), FIGS. 8 and 9 are other examples of FIG. 2(A), FIG. 10 is a diagram showing another example in which the lead wires of the film capacitor of FIG. 3 are arranged on a substrate, FIGS. 11 and 12 are diagrams showing another example in which the lead wires of the film capacitor of FIG. 3 are arranged on a substrate, and FIG. 13 is a diagram showing another example of a lead wire of the film capacitor of FIG. 1.

Referring to FIGS. 1 to 12, a capacitor module according to an embodiment of the invention includes a capacitor 100 and a substrate 200, and the capacitor 100 may include a capacitor body 110, electrodes 121 and 122, a lead wire 131 and 141, a resin portion 150, and a case 120. The capacitor body 110 is a polygonal or cylindrical capacitor made by laminating plastic films, and may be, for example, a film capacitor. The film capacitor is a circuit component applied to a circuit for a power supply device. The capacitor 100 may be a film capacitor.

The electrodes 121 and 122 include a first electrode 121 and a second electrode 122 disposed on both sides of the capacitor 100, and the first electrode 121 and the second electrode 122 serve as paths for charging or discharging electricity. The first electrode 121 and the second electrode 122 may be an anode and a cathode, and may be exposed to the outside of the capacitor body 110.

The lead wires 131 and 141 may include a first lead wire 131 connected to one end 131A of the first electrode 121 and a second lead wire 141 connected to one end 141A of the second electrode 122. The first lead wire 131 may extend from the first electrode 121 toward the substrate 200, and the other end 133 of the first lead wire 131 may protrude toward a lower portion of the substrate 200 through the first hole 211 of the substrate 200. The second lead wire 141 may extend from the second electrode 122 toward the substrate 200, and the other end 143 of the second lead wire 141 may protrude toward a lower portion of the substrate 200 through the second hole 221 of the substrate 200.

The resin portion 150 seals the capacitor body 110. The resin portion 150 may be formed of a resin material such as silicone or epoxy. The resin portion 150 covers the upper surface, lower surface, and side surfaces of the capacitor body 110, and covers the surfaces of the first electrode 121 and the second electrode 122.

One side (i.e., lower surface) of the case 120 is opened and the case 120 has a space inside to accommodate the capacitor body 110. The resin portion 150 is filled in the case 120 in which the capacitor body 110 is provided, thereby sealing the capacitor body 110, the first electrode 121, and the second electrode 122. Here, the resin portion 150 seals the upper portions of the first lead wire 131 and the second lead wire 141. The lower surface of the resin portion 150 may be a concave curved surface and may be disposed above the lower end of the case 120.

The outside of the first lead wire 131 and the second lead wire 141 may protrude from the lower surface of the resin portion 150. The first lead wire 131 may extend vertically (i.e., in a straight line) from the outside of the first electrode 121 toward the first hole 211 of the substrate 200, and may be connected to the second lead wire 131. The wire 141 may extend vertically (i.e., in a straight line) from the outside of the second electrode 122 toward the second hole 221 of the substrate 200. One ends 131A and 141A and other ends 133 and 143 of each of the first and second lead wires 131 and 141 may be arranged on the same straight line.

The first and second lead wires 131 and 141 include a stacked structure of an inner layer L1 and an outer layer L2, as shown in FIG. 4, wherein the inner layer L1 contains copper or iron, and the outer layer L2 may contain at least one of tin, nickel, gold, and copper. The outer layer L2 may be plated on the surface of the inner layer L1.

When the minimum distance from the lower end of the case 120 to the surface (i.e., lower surface) of the resin portion 150 is T1, and a distance from the upper surface of the substrate 200 or the lower end of the case 120 to the exposed portion of the first and second lead wires 131 and 141 is T0, T1<T0 may be satisfied, and T0 may be 3 mm or more, for example, in the range of 3 mm to 5 mm or 3 mm to 10 mm. T1 may be 2 mm or more. Since this is cured after dispensing the resin part 150 in the case 120, the surface of the resin portion 150 located in the center region of the case 120 may be more concave than the surface of the resin portion 150 located outside the case 120.

The case 120 may have a polygonal outer shape, or as another example, a circular shape. The case 120 may be made of plastic, and may be spaced apart from the capacitor body 110 by the resin portion 150.

The substrate 200 may be a flexible or rigid substrate, and may be made of resin or metal. The substrate 200 may include a plurality of holes 211 and 221 in a region corresponding to the capacitor 100, and the plurality of holes 211 and 221 may penetrate from the upper surface to the lower surface of the substrate 200. The plurality of holes 211 and 221 may include a first hole 211 to which the other end 133 of the first lead wire 131 is coupled and a second hole 221 to which the other end 143 of the second lead wire 141 is coupled. The first and second holes 211 and 221 may have diameters larger than the diameters of the first and second lead wires 131 and 141.

When the capacitor body 110 is mounted on the substrate 200 and the first and second lead wires 131 and 141 are coupled to the first and second holes 221, the first and second lead wires 131 and 141 are connected using solder. The first and second lead wires 131 and 141 are fixed through the second holes 211 and 221. At this time, the solder may be exposed to the upper surface of the substrate 200 through the first and second holes 211 and 221, and when hardened, may function as the solder portion 250.

Here, as shown in FIGS. 4 and 5, the substrate 200 further includes a plurality of first sub-holes 215, 216, 217, and 218 around the first hole 211, and the solder is filled in the first sub-holes 215, 216, 217, and 218, so that the other end 133 of the first lead wire 131 may be firmly fixed together with the solder filled in the first sub-holes 215, 216, 217, and 218. The substrate 200 further includes a plurality of second sub-holes 225, 226, 227, and 228 around the second hole 221, and the solder filled is filled in the second sub-holes 225, 226, 227, and 228, so that the other end 413 of the second lead wire 141 may be firmly fixed together with the solder filled in the second hole 221.

A plating layer, for example, made of copper or a copper alloy material, is formed in the first and second holes 211,221, the first sub-holes 215, 216, 217, 218, and the second sub-holes 225, 226, 227, 228 to improve the bonding efficiency with the solder portion 250.

The capacitor body 110 has a thermal expansion coefficient of about 100 ppm/° C., and the thermal expansion coefficient of the substrate 200 is about 15 ppm/° C., and there is difference in thermal expansion coefficient between the capacitor body 110 and the substrate 200. That is, the difference in thermal expansion coefficient between the substrate 200 and the capacitor body 110 may be 6 times or more, for example, in the range of 6 to 10 times. Conventionally, when used for a long time in an environment where temperature conditions change rapidly, cracks may occur due to thermal fatigue in the solder portion 250 that secures the other ends 133 and 143 of the lead wires 131 and 141 through the substrate 200. That is, stress occurs in the solder portion 250 that fixes the capacitor 100 and the substrate 200 when the temperature changes due to a difference in thermal expansion coefficient, and when used for a long time under conditions where the temperature changes, stress occurs in the solder portion 250. There is a problem that it acts repeatedly and develops into cracks (see FIG. 6(A)). Cracks in the solder portion 250 make electrical conduction or mechanical fixation impossible, which may cause electrical failure of the product or fire.

An embodiment of the invention may include a member capable of relieving stress due to a difference in thermal expansion coefficient between the first and second lead wires 131 and 141 and the substrate 200. The member may include bent portions 132 and 142. The bent portions 132 and 142 may be exposed from the resin portion 150 outside of the first and second lead wires 131 and 141. The bent portions 132 and 142 are disposed outside the first and second lead wires 131 and 141, and may be disposed between the resin portion 150 and a horizontal straight line at the lower end of the case 120. The bent portions 132 and 142 may be disposed between the substrate 200 and the resin portion 150. The outside of the first and second lead wires 131 and 141 may be an outer portion of the resin portion 150, and the inside may be an inner portion of the resin portion 150. The bent portions 132 and 142 may be disposed in the lower space 160 of the case 120.

The lower ends P1 of the bent portions 132 and 142 may be disposed on the same straight line as the lower end of the case 120, or may be disposed higher than a straight line extending horizontally from the lower end of the case 120, and for example, may be separated by more than 0.01 mm from the horizontal straight line at the lower end of the case 120. The upper ends P2 of the bent portions 132 and 142 may be located 0.5 mm or more from the upper surface of the substrate 200, and may be adjacent to the resin portion 150 or spaced apart from the surface of the resin portion 150 by 0.05 mm. These bent portions 132 and 142 may be disposed between the substrate 200 and the resin portion 150 to absorb stress transmitted from one ends 131A and 141A of the lead wires 131 and 141 to the other end portions 133 and 143.

The height T2 of the bent portions 132 and 142 may be 0.5 mm or more, for example, in the range of 0.5 mm to 3 mm, and may be smaller than the distance T0, for example, 30% or more, for example, in a range of 50% to 90% of the distance T0.

As shown in FIGS. 2 and 5, the bent portions 132 and 142 may be bent inward at the respective centers of the first and second lead wires 131 and 141. The depth D1 of the bent portions 132 and 142 may be bent to 0.3 mm or more, for example, in a range of 0.3 mm to 1.5 mm or 0.3 mm to 1 mm from the centers of the first and second lead wires 131 and 141. The depth D1 of the bent portions 132 and 142 may be smaller than the diameter or thickness of the first and second lead wires 131 and 141. When the depth D1 of the bent portions 132 and 142 is smaller than the above range, stress absorption is minimal, and when it is larger than the above range, the size of the lower space 160 of the case 120 increases.

When viewed from a side cross-section, the shape of the bent portions 132 and 142 may be a triangular shape connecting the upper, lower, and inner ends of the bent portions 132 and 142. The bent portions 132 and 142 of the first and second lead wires 131 and 141 may be bent toward the inside of the case 120. Accordingly, the bent portions 132 and 142 absorb stress due to a difference in thermal expansion coefficient transmitted from the capacitor body 110 to the substrate 200. Accordingly, by absorbing the stress, the impact transmitted to the solder portion 250 from the other ends 133 and 143 of the first and second lead wires 131 and 141 coupled in the first and second holes 211 and 221 of the substrate 200 may be blocked, so that the occurrence of cracks in the solder portion 250 may be eliminated even when used for a long time in an environment where the temperature changes or where there is a lot of movement (see FIG. 6(B)).

As shown in FIGS. 7 and 10, the bent portions 132A and 142A of the first and second lead wires 131 and 141 may be bent outward from the center of the capacitor 100. The bent portions 132A and 142A may have a triangular side cross section. Here, when the bent portions 132A and 142A are bent in the outward direction, they are adjacent to the inner surface of the case 120 and may not contact them. In this case, the size of the case 120 may be further increased. One ends 131A and 141A and other ends 133 and 143 of each of the first and second lead wires 131 and 141 may be arranged on the same straight line.

As shown in FIG. 8, the bent portions 132B and 142B of the first and second lead wires 131 and 141 may be bent inward from the center of the capacitor 100. The bent portions 132B and 142B have a curved surface and may have side cross-sections in a hemispherical or semi-elliptical shape. Here, when the bent portions 132B and 142B are bent in the inward direction, the size of the case 120 may not be considered. One ends 131A and 141A and other ends 133 and 143 of each of the first and second lead wires 131 and 141 may be arranged on the same straight line.

As shown in FIG. 9, the bent portions 132C and 142C of the first and second lead wires 131 and 141 may be bent outward from the center of the capacitor 100. The bent portions 132C and 142C have a curved surface and may be provided in a hemispherical or semi-elliptical shape. Here, when the bent portions 132C and 142C are bent in the outward direction, the bent portions 132C and 142C may be disposed closer to the inner surface of the case 120 than the ends 131A and 141A. One ends 131A and 141A and other ends 133 and 143 of each of the first and second lead wires 131 and 141 may be arranged on the same straight line.

As shown in FIG. 11, the bent portions 132D and 142D of the first and second lead wires 131 and 141 may be bent in a direction perpendicular to the direction of thermal expansion of the capacitor 100. Here, the direction of thermal expansion may be the longitudinal direction of the capacitor body 110 or the direction of both electrodes. The bent portions 132D and 142D may have an angular shape or a curved shape. One ends 131A and 141A and other ends 133 and 143 of each of the first and second lead wires 131 and 141 may be arranged on the same straight line.

As shown in FIG. 12, the bent portions 132E and 142E of the first and second lead wires 131 and 141 may be bent in a direction perpendicular to the direction of thermal expansion of the capacitor 100. The bent portion 132E of the first lead wire 131 and the bent portion 142E of the second lead wire 141 may be bent in opposite directions. As described above, since the bent portions 132E and 142E of the first and second lead wires 131 and 141 are bent in opposite directions, the stress transmitted to the lead wires 131 and 141 may be effectively absorbed while being stably supported. Here, the direction of thermal expansion may be the longitudinal direction of the capacitor body 110 or the direction of both electrodes. The bent portions 132E and 142E may have an angular shape or a curved shape. One ends 131A and 141A and other ends 133 and 143 of each of the first and second lead wires 131 and 141 may be arranged on the same straight line.

As shown in FIG. 13, the bent portions 132F and 142F of the first and second lead wires 131 and 141 may be provided in a diagonal shape, and may be bent in the same direction as or orthogonal to the thermal expansion direction of the capacitor 100. One ends 131A and 141A and other ends 133 and 143 of each of the first and second lead wires 131 and 141 may be arranged on different straight lines. For example, the other ends 133 and 143 of each of the first and second lead wires 131 and 141 may be disposed further outside than the ends 131A and 141A. The other ends 133 and 143 of each of the first and second lead wires 131 and 141 may absorb or buffer stress transmitted through the ends 131A and 141A of the first and second lead wires 131 and 141. Accordingly, a certain effect can be provided even without bending the bent portions 132F and 142F into a triangular or hemispherical shape.

The components of the embodiments disclosed above may be individually configured or mixed with each other. For example, the shapes of the bent portions of the two lead wires 131 and 141 may be a mixture of angular and curved shapes. Additionally, the bent portions of the lead wires 131 and 141 are diagonal and may have an angled or curved shape.

Features, structures, effects, etc. described in the above embodiments are included in at least one embodiment of the invention, and are not necessarily limited to only one embodiment. Furthermore, features, structures, effects, etc.

illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. A film capacitor comprising:

a case with open lower surface;

a capacitor body disposed within the case and having first and second electrodes on both sides;

a resin portion sealing the capacitor body;

a first lead wire having one end connected to the first electrode of the capacitor body and having an outer portion exposed to an outside of the resin portion; and a second lead wire having one end connected to the second electrode of the capacitor body and having an outer portion exposed to the outside of the resin portion, wherein each of the first and second lead wires includes a bent portion curved between a lower end of the case and the resin portion, wherein a substrate is disposed under the case and includes a first hole coupled to another end of the first lead wire, and a second hole coupled to another end of the second lead wire, wherein a solder portion fixes the other ends of the first and second lead wires in the first and second holes, wherein the other ends of each of the first and second lead wires extend from the bent portions and are disposed on same straight lines as the one ends of each of the first lead and second lead wires, wherein the substrate includes a plurality of first sub-holes around the first hole, and a plurality of second sub-holes around the second hole, and wherein the solder portion is disposed in the first and second sub-holes, respectively.

2. The film capacitor of claim 1, wherein the bent portions of the first and second lead wires are bent toward an inside of the case.

3. The film capacitor of claim 1, wherein the bent portions of the first and second lead wires are bent toward an outside of the case.

4. The film capacitor of claim 1, wherein the bent portions of the first and second lead wires are bent in different directions of the case.

5. The film capacitor of claim 1, wherein the bent portions of the first and second lead wires have a triangular or hemispherical side cross section.

6. The film capacitor of claim 1, wherein the other ends of each of the first and second lead wires extend from the bent portions and are disposed outside of the one end of each of the first and second lead wires.

7. The film capacitor of claim 1, wherein lower ends of the bent portions of the first and second lead wires are disposed on a same straight line as the lower end of the case.

8. The film capacitor ale of claim 1, wherein lower ends of the bent portions of the first and second lead wires are disposed higher than a horizontal straight line at the lower end of the case, and wherein upper ends of the bent portions of the first and second lead wires are in a range of 0.5 mm to 3 mm from the lower end of the case.

9. The film capacitor of claim 1, wherein the bent portions of the first and second lead wires have a concave depth from a center of each of the first and second lead wires extending vertically from the resin portion toward an inside of the bent portions, and wherein the concave depth is smaller than a diameter of each of the first and second lead wires.

10. The file capacitor of claim 1, wherein a lower surface of the resin portion includes a concave curved surface, wherein a minimum distance from the lower end of the case to the lower surface of the resin portion is T1, wherein a distance from the lower end of the case to an exposed portion of the first and second lead wires on the lower surface of the resin portion is T0, and wherein a following condition is satisfied: T1<T0.

11. A capacitor module comprising:

a capacitor including:

a case with open lower surface;

a capacitor body disposed within the case and having first and second electrodes on both sides;

a resin portion sealing the capacitor body;

a first lead wire having one end connected to the first electrode of the capacitor body and having an outer portion exposed to an outside of the resin portion;

a second lead wire having one end connected to a second electrode of the capacitor body and having an outer portion exposed to the outside of the resin portion;

a substrate disposed under the case and including:

a first hole coupled to another end of the first lead wire; and a second hole coupled to another end of the second lead wire; and a solder portion that fixes the other ends of the first and second lead wires in the first and second holes, wherein each of the first and second lead wires includes a bent portion curved between the substrate and the resin portion, wherein the beat portions of the first and second lead wires have a concave depth from a center of each of the first and second lead wires extending vertically from the resin portion toward an inside of the bent portions, and wherein the concave depth is smaller than a diameter of each of the first and second lead wires.

12. The capacitor module of claim 11, wherein an entire region of the bent portions of the first and second lead wires are disposed between the substrate and the resin portion.

13. The capacitor module of claim 11, wherein the bent portions of the first and second lead wires are bent toward an inside or outside of the case.

14. The capacitor module of claim 11, wherein the bent portions of the first and second lead wires are bent in different directions of the case.

15. The capacitor module of claim 11, wherein the bent portions of the first and second lead wires have a triangular or hemispherical side cross section.

16. The capacitor module of claim 11, wherein the capacitor body is a film capacitor.

17. The capacitor module of claim 11, wherein lower ends of the bent portions of the first and second lead wires are disposed on a same straight line as a lower end of the case.

18. The capacitor module of claim 11, wherein lower ends of the bent portions of the first and second lead wires are disposed higher than a horizontal straight line at a lower end of the case, and wherein upper ends of the bent portions of the first and second lead wires are in a range of 0.5 mm to 3 mm from an upper surface of the substrate.

19. The capacitor module of claim 11, wherein a lower surface of the resin portion includes a concave curved surface, wherein a minimum distance from the lower end of the case to the lower surface of the resin portion is T1, wherein a distance from the lower end of the case to an exposed portion of the first and second lead wires on the lower surface of the resin portion is T0, and wherein a following condition satisfied: T1<T0.

* * * * *